(12) United States Patent
Nagai (10) Patent No.: US 8,820,494 B2
(45) Date of Patent: Sep. 2, 2014

(54) HYDRAULIC SHOCK ABSORBING APPARATUS OF VEHICLE

(75) Inventor: Osamu Nagai, Shizuoka (JP)

(73) Assignee: Showa Corporation (JP)

(*) Notice: Subject to any disclaimer, the term of this patent is extended or adjusted under 35 U.S.C. 154(b) by 376 days.

(21) Appl. No.: 12/799,960

(22) Filed: May 5, 2010

(65) Prior Publication Data
US 2010/0294606 A1 Nov. 25, 2010

Related U.S. Application Data

(63) Continuation-in-part of application No. 10/736,150, filed on Dec. 15, 2003, now abandoned.

(51) Int. Cl.
*F16F 9/34* (2006.01)
*F16F 9/36* (2006.01)
*F16F 9/18* (2006.01)

(52) U.S. Cl.
CPC .. *F16F 9/185* (2013.01); *F16F 9/36* (2013.01)
USPC ........................................ 188/282.1; 188/315

(58) Field of Classification Search
USPC ........ 188/314, 316, 281, 282.1, 282.5, 282.6, 188/297, 315, 276; 280/276; 180/218, 219
See application file for complete search history.

(56) References Cited

U.S. PATENT DOCUMENTS

| | | | | |
|---|---|---|---|---|
| 1,948,185 A * | 2/1934 | Padgett | ......................... | 188/315 |
| 2,738,036 A * | 3/1956 | Crabtree | ....................... | 188/315 |
| 2,917,303 A * | 12/1959 | Vierling | ........................ | 267/225 |
| 3,024,874 A * | 3/1962 | De Koning et al. | ........... | 188/286 |
| 3,447,797 A * | 6/1969 | Roberts | ........................... | 267/34 |
| 6,659,242 B2 * | 12/2003 | Nagai | ........................... | 188/315 |
| 2003/0001359 A1* | 1/2003 | Miyabe | ......................... | 280/276 |
| 2003/0094341 A1* | 5/2003 | Lemieux | ....................... | 188/316 |
| 2005/0127587 A1* | 6/2005 | Nagai | ........................... | 267/266 |
| 2007/0144845 A1* | 6/2007 | Saito | ............................. | 188/281 |

FOREIGN PATENT DOCUMENTS

| | | | | |
|---|---|---|---|---|
| EP | 1077175 A2 * | 2/2001 | ............ | B62K 25/08 |
| JP | 2000065117 A * | 3/2000 | ................ | F16F 9/16 |
| JP | 2010159018 A * | 7/2010 | | |

OTHER PUBLICATIONS

Machine Translation of JP 2000-065117 (no date).*

* cited by examiner

*Primary Examiner* — Bradley King
*Assistant Examiner* — Nicholas J Lane
(74) *Attorney, Agent, or Firm* — Keith H. Orum; Orum & Roth, LLC

(57) ABSTRACT

A hydraulic shock absorbing apparatus of a vehicle is described in which hydraulic shock absorbers are provided at both left and right sides of a wheel. One hydraulic shock absorber is provided with a compression side damping valve in one oil passage of a piston, is provided with a check valve in another oil passage, and is provided with a volume compensating oil passage of a piston rod communicated with an oil reservoir chamber in a piston rod side oil chamber. The other hydraulic shock absorber is provided with an expansion side damping valve in one oil passage of the piston, is provided with a check valve closing at the time of expansion and opening at the time of compression in another oil passage, and is provided with a volume compensating oil passage of the piston rod communicated with the oil reservoir chamber in a piston side oil chamber.

4 Claims, 7 Drawing Sheets

HYDRAULIC SHOCK ABSORBING APPARATUS OF VEHICLE

This application is a continuation-in-part of U.S. application Ser. No. 10/736,150 filed on 15 Dec. 2003 now abandoned.

BACKGROUND OF THE INVENTION

1. Field of the Invention

The present invention relates to a hydraulic shock absorbing apparatus of a vehicle.

2. Description of the Related Art

For a hydraulic shock absorber of a vehicle, there is a structure in which a hydraulic shock absorber is provided in right and left sides of a wheel. As shown in Japanese Unexamined Utility Model Publication No. 64-41495, each of the shock absorbers has an expansion side damping force generating apparatus which is provided with two oil passages in a piston sliding within a cylinder. An expansion side damping valve generating an expansion side damping force in one oil passage is present, along with a compression side check valve easily opened at the time of compression and generating a slight compression side damping force in another oil passage. Each of the shock absorbers has a compression side damping force generating apparatus which is provided with two oil passages in a sub piston fixed to a bottom portion of the cylinder. A compression side damping valve generating a compression side damping force with respect to a working fluid in correspondence to a forward moving volume of a piston rod in one oil passage is present. An expansion check valve is also present and which is easily opened at the time of expansion and which generating a slight expansion side damping force in another oil passage.

In the conventional art, both of the hydraulic shock absorbers provided in both sides of the wheel have the expansion side damping force generating apparatus provided in the piston sliding within the cylinder, and the compression side damping force generating apparatus provided in the sub piston fixed to the bottom portion of the cylinder. Accordingly, the damping valve structure in each of the hydraulic shock absorbers is complex so as to increase the number of the parts, thereby making it difficult to reduce manufacturing cost.

SUMMARY OF THE INVENTION

An object of the present invention is to simplify a damping valve structure in each of hydraulic shock absorbers and to reduce manufacturing cost in a hydraulic shock absorbing apparatus provided with the hydraulic shock absorbers at right and left sides of a wheel.

The present invention relates to a hydraulic shock absorbing apparatus of a vehicle provided with hydraulic shock absorbers at right and left sides of a wheel. A compression side damping force generating means for mainly generating a compression side damping force is provided in one hydraulic shock absorber. An expansion side damping force generating means for mainly generating an expansion side damping force is provided in another hydraulic shock absorber. The generation of the compression side damping force and the expansion side damping force is shared by the right and left hydraulic shock absorbers. The one hydraulic shock absorber comprises a vehicle body side tube and a wheel side tube which are slidably fitted to each other. A damper constituted by a damper cylinder and a piston rod in which a piston sliding within the damper cylinder is mounted to a leading end portion thereof are present. These are structured such that the damper cylinder is mounted to an inner side of the wheel side tube and the piston rod is mounted to an inner side of the vehicle body side tube. A piston rod side oil chamber and a piston side oil chamber are sectioned within the damper cylinder by the piston. An oil reservoir chamber is provided in an outer periphery of the damper cylinder. Two oil passages are provided in the piston, in which a compression side damping valve is provided in the one oil passage, and a check valve closing at the time of compression and opening at the time of expansion is provided in the another oil passage. A volume compensating oil passage of the piston rod communicating the piston rod side oil chamber with the oil reservoir chamber is provided.

The present invention relates to a hydraulic shock absorbing apparatus of a vehicle having hydraulic shock absorbers provided at both right and left sides of a wheel. Each of the hydraulic shock absorbers are structured such that a vehicle body side tube and a wheel side tube are slidably fitted. A damper is constituted by a damper cylinder and a piston rod having a piston sliding within the damper cylinder. The piston is mounted to a leading end portion thereof. The damper cylinder is mounted to an inner side of the wheel side tube, and the piston rod is mounted to an inner side of the vehicle body side tube. A piston rod side oil chamber receiving the piston rod and a piston side oil chamber not receiving the piston rod are sectioned in both sides of the piston. Two oil passages communicating the two oil chambers are provided in the piston. An oil reservoir chamber for compensating a volume of the piston rod is provided in an outer periphery of the damper cylinder. One of the hydraulic shock absorbers is provided with a compression side damping valve in one oil passage of the piston, and a check valve which closes during compression and opens during expansion in another oil passage. An oil passage for compensating a volume of the piston rod communicated with the oil reservoir chamber is provided in the piston rod side oil chamber. Another of the hydraulic shock absorbers is provided with an expansion side damping valve in one oil passage of the piston, and is provided with a check valve which closes during expansion and which opens during compression in another oil passage. An oil passage for compensating, the volume of the piston rod communicated with the oil reservoir chamber is provided in the piston side oil chamber.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 3A and 3B show a modified embodiment in which an oil passage is provided in a rod guide, in which

DESCRIPTION OF THE PREFERRED EMBODIMENTS

A hydraulic shock absorbing apparatus 1 of a vehicle is constituted by left and right shock absorbers 100 and 200 provided at both left and right sides of the vehicle. The hydraulic shock absorbing apparatus 1 is structured such that wheel side tubes of the left and right hydraulic shock absorbers are mounted to both sides of a common axle as in a front fork of a two-wheeled vehicle or the like. The left and right hydraulic shock absorbers may be mounted to a common swing arm as in a rear side hydraulic shock absorbing apparatus of a two-wheeled vehicle or the like, except in an independent suspending type hydraulic shock absorbing apparatus.

Figure 1:
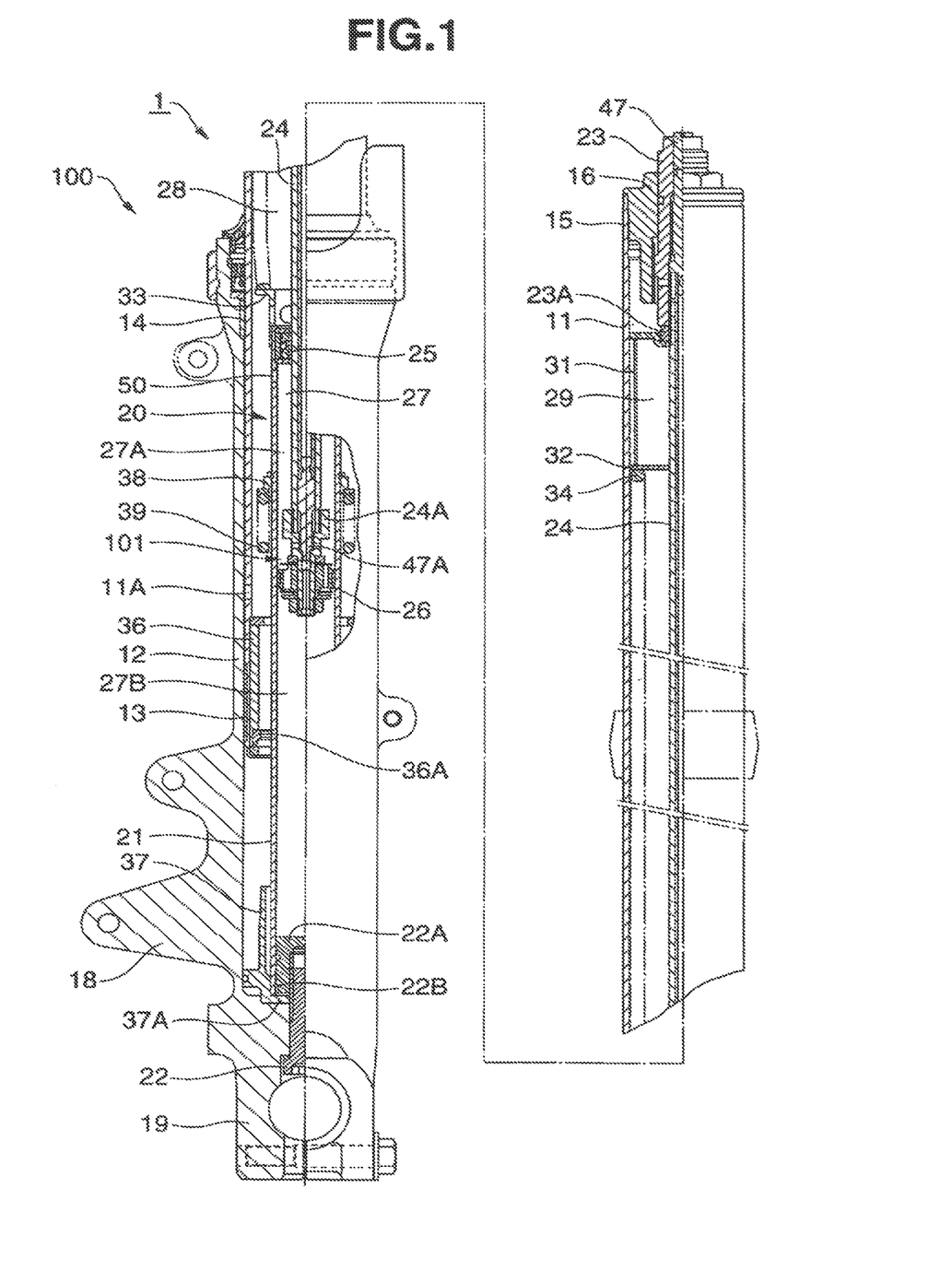
FIG. 1 is a general view showing one of right and left hydraulic shock absorbers.
Figure 2:
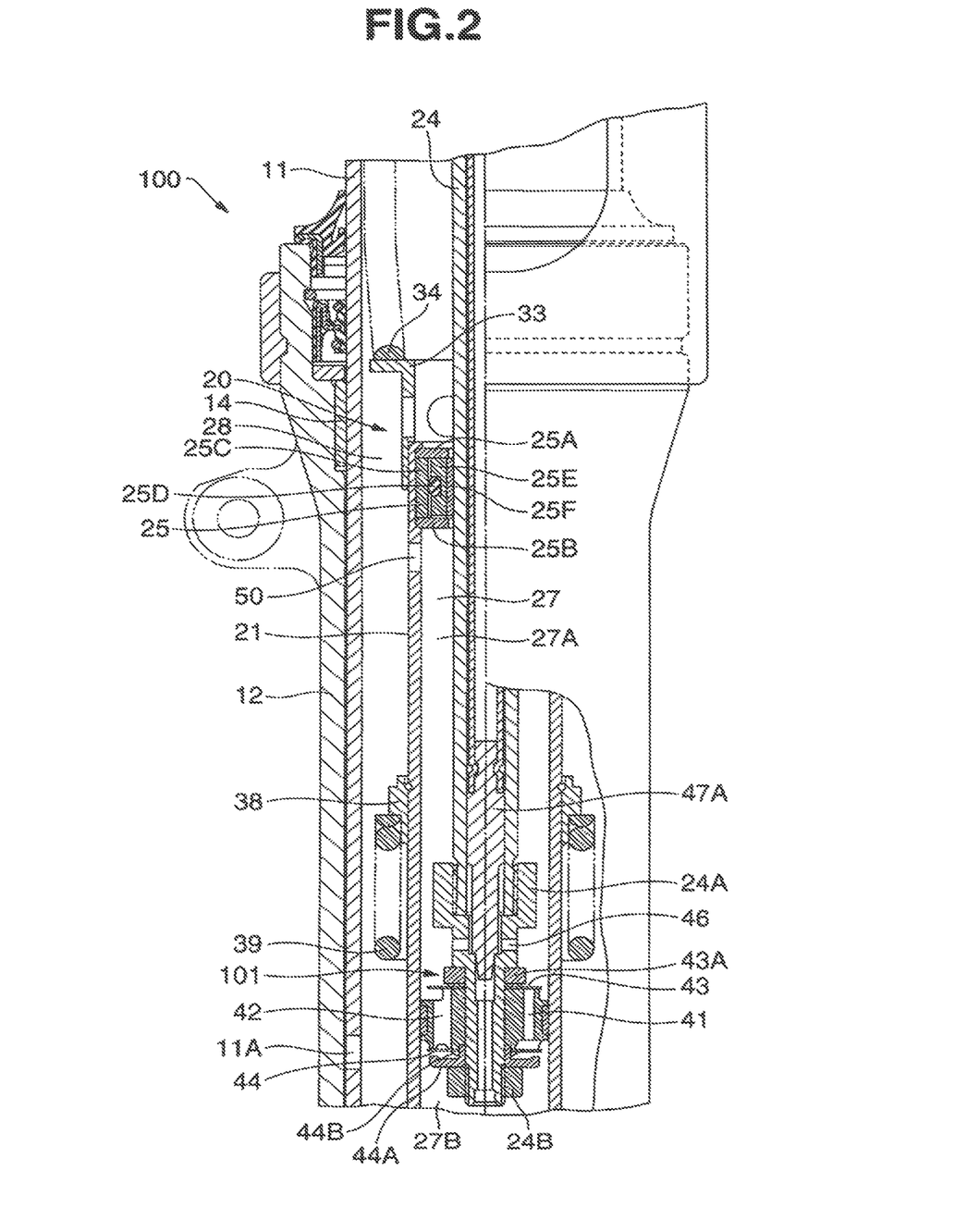
FIG. 2 is an enlarged view of a main portion in FIG. 1.
Figure 3A:
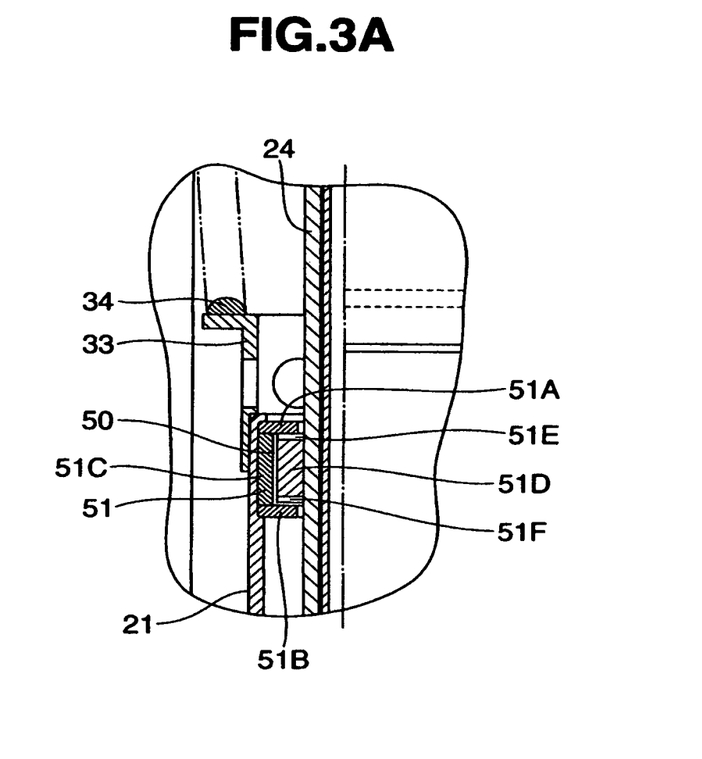
FIG. 3A is a cross sectional view and FIG. 3B is a plan view of a bush.
Figure 3B:
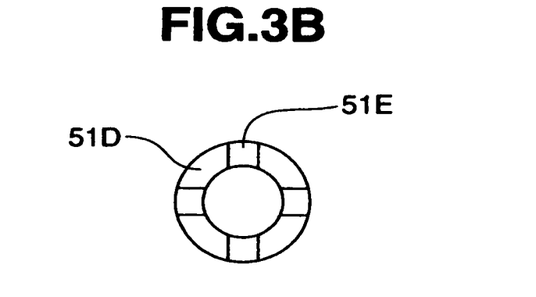
Figure 4:
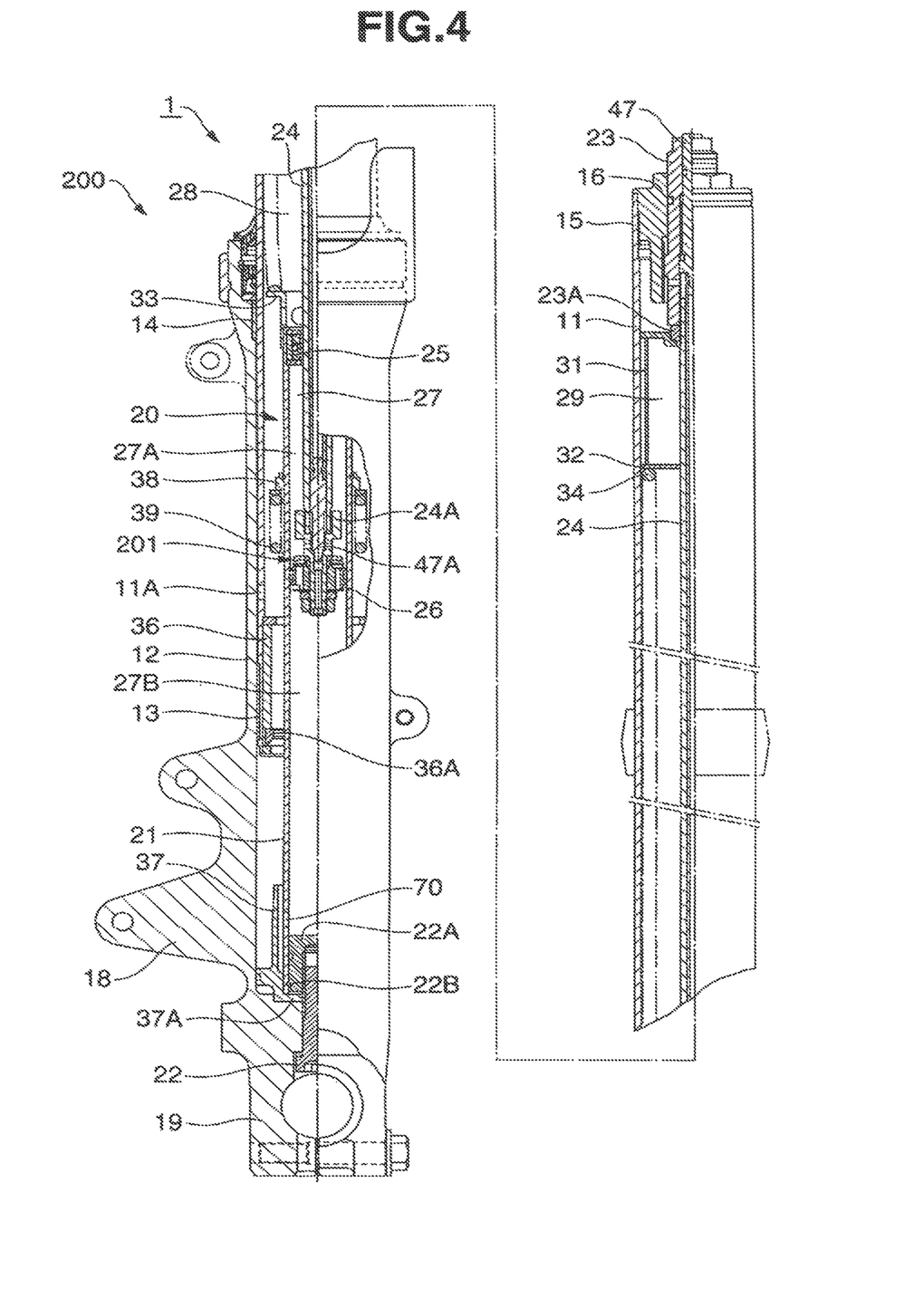
FIG. 4 is a general view showing another angle of the right and left hydraulic shock absorbers.
Figure 5:
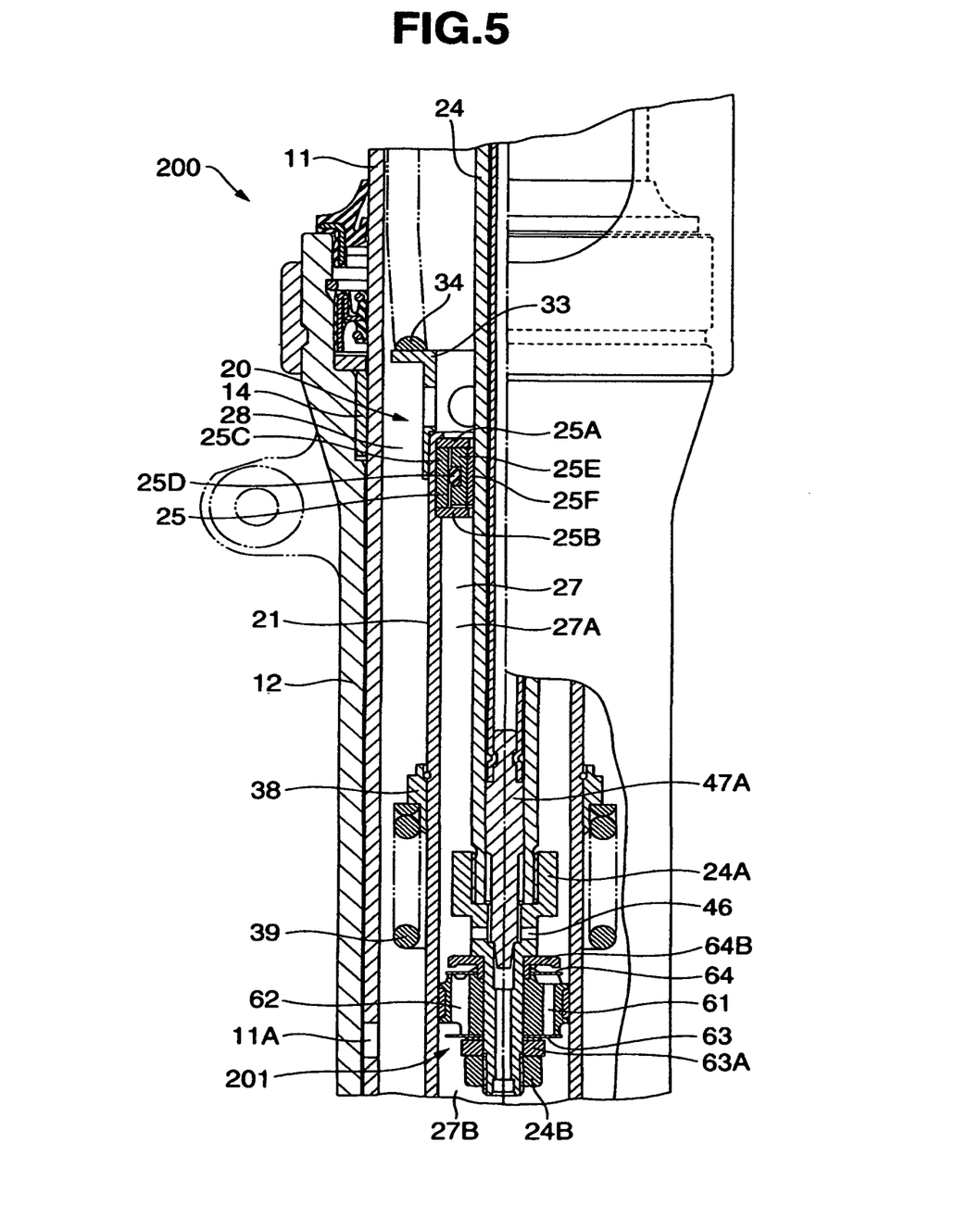
FIG. 5 is an enlarged view of a main portion in FIG. 4.

One of the left and right hydraulic shock absorbers 100 is structured as shown in FIGS. 1 to 3, and another of the left and right hydraulic shock absorbers 200 is structured as shown in FIG. 4 and FIG. 5. The hydraulic shock absorbing apparatus 1 is provided with a compression side damping force generating means 101 mainly generating a compression side damping force in one hydraulic shock absorber 100, and is provided with an expansion side damping force generating means 201 mainly generating an expansion side damping force in another hydraulic shock absorber 200. The generation of the compression side damping force and the expansion side damping force is shared by the left and right hydraulic shock absorbers 100 and 200.

Hydraulic Shock Absorber 100, FIGS. 1 to 3

The hydraulic shock absorber 100 is structured, as shown in FIG. 1, such that a vehicle body side tube 11 and a wheel side tube 12 are slidably fitted to each other in a liquid-tight manner. A bush 13 is provided in an outer periphery in a lower end side of the vehicle body side tube 11, and a bush 14 is provided in an inner periphery in an upper end side of the wheel side tube 12. An oil hole 11A communicating an oil reservoir chamber 28 mentioned below with an annular gap damped by the bushes 13 and 14 between the vehicle body side tube 11 and the wheel side tube 12 is provided in a lower end side of the vehicle body side tube 11.

The vehicle body side tube 11 has a cap 16 detachably arranged in an opening portion 15 of the upper end portion in a liquid-tight manner, and is provided with a vehicle body side mounting portion in the vehicle body side tube 11. The wheel side tube 12 is integrally provided with a bottom bracket 18 in the lower end portion, and is provided with an axle side mounting portion 19 in a bottom bracket 18.

The hydraulic shock absorber 100 receives a damper cylinder 21 and a piston rod 24 constituting a damper 20 in inner portions of the vehicle body side tube 11 and the wheel side tube 12. The hydraulic shock absorber 100 is provided with the damper cylinder 21 fixed to the inner portion of the bottom bracket 18 in the inner portion of the wheel side tube 12 in a rising manner. A stopper ring 22A engaged with an inner periphery of a lower end of the damper cylinder 21 is pulled by a center bolt 22 inserted and attached to a bottom portion of the bottom bracket 18. The damper cylinder 21 is fixed to the bottom portion of the bottom bracket 18 under interposition of a flange 37A of an oil lock piece 37 mentioned below. The front fork 10 is structured such that a spring load adjusting sleeve 23 is screwed in a liquid-tight manner with a center portion of the cap 16. A hollow piston rod 24 and a lock nut 23A are screwed with a lower end portion a the spring load adjusting sleeve 23 inserted to the inner portion of the vehicle body side tube 11. The piston rod 24 is fixedly supported to the vehicle body side tube 11. The piston rod 24 slidably passes through a rod guide 25 provided in an upper end portion of the damper cylinder 21 so as to be inserted to an oil chamber 27 in the inner portion of the damper cylinder 21, and is provided with a piston 26 in a piston bolt 24A arranged in an insertion leading end portion thereof. The piston 26 is fixed by a nut 24B screwed with the piston bolt 24A. The piston 26 vertically slides along an inner surface of the damper cylinder 21. The oil chamber 27 is sectioned into a piston rod side oil chamber 27A in a side to which the piston rod 24 is inserted, and a piston side oil chamber 27B in a side to which the piston rod 24 is not inserted, by the piston 26.

The rod guide 25 is provided with an inner collar 25E to which an O-ring 25D is fitted and attached, in upper and lower washers 25A and 25B fixed to the upper end portion of the damper cylinder 21 in accordance with a caulking operation, and an inner portion of an outer collar 25C, and which slidably supports the piston rod 24 by a bush 25F pressure inserted to the inner collar 25E. The O-ring 25D absorbs an axial displacement between the damper cylinder 21 and the piston rod 24. The inner collar 25E and the bush 25F may vertically move between the upper and lower washers 25A and 25B, or may be fixed so as to be immobile vertically.

The hydraulic shock absorber 100 is structured such that a space in an outer periphery of the damper cylinder 21 is formed as the oil reservoir chamber 28 between the vehicle body side tube 11 and the wheel side tube 12. A gas chamber, such as an air chamber, 29 is formed in an upper portion of the oil reservoir chamber 28.

The hydraulic shock absorber 100 has a spring collar 31 constituted by a connection of a plurality of members which ascend and descend where being supported by the spring load adjusting sleeve 23 mentioned above provided in the cap 16. It is structured such that a suspension spring 34 is interposed between an upper spring seat 32 backed up by the spring collar 31, and a lower spring seat 33 fixed to an outer periphery of the upper end portion of the damper cylinder 21.

The hydraulic shock absorber 100 buffers an impact force applied from a road surface when the vehicle travels by a spring reaction force of the suspension spring 34, and a spring reaction force applied by the gas spring in the air chamber 29.

The hydraulic shock absorber 100 has the compression side damping force generating means 101 mentioned above in order to damp an expansion and contraction vibration of the suspension spring 34 and the gas spring in the gas chamber 29.

The compression side damping force generating means 101 has a compression side oil passage 41 and an expansion side flow passage 42 allowing the piston rod side oil chamber 27A and the piston side oil chamber 27B to be communicated. The piston 26, slidably in contact with the inner surface of the damper cylinder 21, as shown in FIG. 2, can open and dose the compression side oil passage 41 by the compression side damping valve 43, and can open and dose the expansion side flow passage 42 by the check valve 44. The compression side damping valve 43 is supported in a backup manner by a valve stopper 43A engaged by the piston rod 24. The check valve 44 is supported in a backup manner by a valve spring 44B held by a spring receiver 44A fixed by the nut 24B, which is closed at the time of compression and is opened at the time of expansion.

The compression side damping force generating means 101 has a bypass passage 46 which can communicate the piston rod side oil chamber 27A with the piston side oil chamber 27B while bypassing the piston 26 in an inner portion of the piston rod 24, the piston bolt 24A, and can open and close the bypass flow passage 46 by a needle valve 47A. At this time, a damping force adjusting rod 47 is screwed with a center of the spring load adjusting sleeve 23 provided in the cap 16. The damping force adjusting rod 47 is inserted to the hollow portion of the piston rod 24, and the needle valve 47A mentioned above is provided in an insertion end thereof.

The needle valve 47A provided in the compression side damping force generating means 101 of the hydraulic shock absorber 100 serves as a compression side damping force adjusting apparatus.

The compression side damping force generating means 101 is provided with a volume compensating hole-shaped oil passage 50 of the piston rod 24 in a side wall of the upper end side of the damper cylinder 21. The oil passage 50 communicates the piston rod side oil chamber 27A with the oil reservoir chamber 28.

Accordingly, the hydraulic shock absorber 100 is operated in the following manner.

Compression Stroke

At the time of compression of the hydraulic shock absorber 100, the vehicle body side tube 11 and the wheel side tube 12 are compressed relatively, and the suspension spring 34 is compressed. The piston rod 24 moves forward into the damper cylinder 21, the oil in the piston side oil chamber 27B flows to the piston rod side oil chamber 27A through the bypass oil passage 46 of the piston 26 at the time of low speed, and the compression side damping force is obtained on the basis of a throttle resistance of the needle valve 47A during this time. During middle and high speed, the oil in the piston side oil chamber 27B flows to the piston rod side oil chamber 27A through the compression side damping valve 43 in the compression side oil passage 41 of the piston 26. The compression side damping force is obtained on the basis of a deflection resistance of the compression side damping valve 43 during this time. The spring force of the suspension spring 34 buffers the impact at the time of compression, and the compression side damping force controls a compression speed of the suspension spring 34.

In this case, during the greatest compression of the hydraulic shock absorber 100, the check valve 36A of the oil lock collar 36 provided in the lower end portion of the vehicle body side tube 11 is fitted to an outer periphery of the oil lock piece 37 provided in a rising manner in the bottom portion of the wheel side tube 12. The oil lock oil chamber is sectioned between the wheel side tube 12 and the oil lock piece 37, and a maximum compression stroke is controlled.

During compression of the hydraulic shock absorber 100, the oil in an amount corresponding to the forward moving volume of the piston rod 24 to the damper cylinder 21 is discharged from the piston rod side oil chamber 27A to the oil reservoir chamber 28 through the oil passage 50 of the damper cylinder 21.

Expansion Stroke

During expansion of the hydraulic shock absorber 100, the vehicle body side tube 11 and the wheel side tube 12 are expanded relatively, and the suspension spring 34 is expanded. The piston rod 24 moves backward from the damper cylinder 21, The oil in the piston rod side oil chamber 27A flows to the piston side oil chamber 27B while pushing open the check valve 44 in the expansion side oil passage 42 of the piston 26.

In this case, at the time of greatest expansion of the hydraulic shock absorber 100, a rebound spring 39 supported in a backup manner by a spring receiver 38 engaged with the outer peripheral portion in the upper end side of the damper cylinder 21 is compressed by the upper end washer of the oil lock collar 36, and a maximum expansion stroke is controlled.

During expansion of the hydraulic shock absorber 100, the oil in an amount corresponding to the backward moving volume of the piston rod 24 from the damper cylinder 21 is resupplied to the piston rod side oil chamber 27A from the oil reservoir chamber 28 through the oil passage 50 of the damper cylinder 21.

In the hydraulic shock absorber 100, the oil passage 50 provided for compensating the volume of the piston rod 24 may be formed in a rod guide 51, corresponding to the rod guide 25 mentioned above, provided in the upper end portion of the damper cylinder 21 for guiding the piston rod 24, as shown in FIG. 3. The rod guide 51 receives a bush 51D in an inner portion of upper and lower washers 51A and 51B fixed to the upper end portion of the damper cylinder 21 in accordance with a caulking operation, and an outer collar 51C via an annular gap. It is provided with oil grooves 51E and 51F extending around an entire length of the bush 51D in a radial direction, in a plurality of positions of upper and lower end surfaces of the bush 51D in a peripheral direction. The bush 51D may vertically move between the upper and lower washers 51A and 51B, or may be fixed so as to be immobile vertically. The oil passage 50 is formed by a gap formed by inner peripheries of the upper end lower washers 51A and 51B with respect to an outer periphery of the piston rod 24, the upper and lower oil grooves 51E and 51F, and an annular gap between the outer collar 51C and the bush 51D.

Hydraulic Shock Absorber 200, FIGS. 4 and 5

The hydraulic shock absorber 200 is different from the hydraulic shock absorber 100 mainly in that the compression side damping force generating means 101 in the hydraulic shock absorber 100 is replaced by an expansion side damping force generating means 201, as shown in FIG. 4.

The hydraulic shock absorber 200 has the expansion side damping force generating means 201 mentioned above, in order to damp the expansion and contraction vibration of the suspension spring 34 and the air spring in the air chamber 29.

In the expansion side damping force generating means 201, the piston 26 provided in the piston bolt 24A of the piston rod 24 is reverted to that in the compression side damping force generating means 101 of the hydraulic shock absorber 101, as shown in FIG. 5. The expansion side damping force generating means 201 has an expansion side oil passage 61 and a compression side oil passage 62 allowing the piston rod side oil chamber 27A and the piston side oil chamber 27B to be communicated. The piston 26 which is slidably in contact with the inner surface of the damper cylinder 21, can open and dose the expansion side oil passage 61 by an expansion side damping valve 63, and can open and close the compression side oil passage 62 by a check valve 64. The expansion side damping valve 63 is supported in a backup manner by a valve stopper 63A fixed by the nut 24B. The check valve 64 which is supported in a backup manner by a valve spring 64B held by a spring receiver 64A engaged by the piston rod 24, is closed during expansion and is opened during compression.

The expansion side damping force generating means 201 has a bypass oil passage 46 which can communicate the piston rod side oil chamber 27A with the piston side oil chamber 27B while bypassing the piston 26, in the inner portion of the piston rod 24, the piston bolt 24A, in the same manner as that of the compression side damping force generating means 101. The bypass oil passage 46 can be opened and closed by the needle valve 47A. At this time, the damping force adjusting rod 47 is screwed with the center of the spring load adjusting sleeve 23 provided in the cap 16. The damping force adjusting rod 47 is inserted into the hollow portion of the piston rod 24, and the needle valve 47A mentioned above is provided in the insertion end thereof.

The needle valve 47A provided in the expansion side damping force generating means 201 of the hydraulic shock absorber 200 serves as an expansion side damping force adjusting apparatus.

The expansion side damping force generating means 201 is provided with a volume compensating hole-shaped oil passage 70 of the piston rod 24 in the side wall of the lower end side of the damper cylinder 21. The oil passage 70 communicates the piston side oil chamber 27B with the oil reservoir chamber 28.

The hydraulic shock absorber 200 is operated in the following manner.

Compression Stroke

During compression of the hydraulic shock absorber 200, the vehicle body side tube 11 and the wheel side tube 12 are compressed relatively, and the suspension spring 34 is compressed. The piston rod 24 moves forward into the damper cylinder 21, and the oil in the piston side oil chamber 27B flows to the piston rod side oil chamber 27A while pushing open the check valve 64 in the compression side oil passage 62 of the piston 26.

At the time of maximum compression of the hydraulic shock absorber 200, the check valve 36A of the oil lock collar 36 provided in the lower end portion of the vehicle body side tube 11 is fitted to an outer periphery of the oil lock piece 37 provided in a rising manner in the bottom portion of the wheel side tube 12. The oil lock oil chamber is sectioned between the wheel side tube 12 and the oil lock piece 37, and the maximum compression stroke is controlled.

During compression of the hydraulic shock absorber 200, oil in an amount corresponding to the forward moving volume of the piston rod 24 to the damper cylinder 21 is discharged from the piston rod side oil chamber 27B to the oil reservoir chamber 28 through the oil passage 70 of the damper cylinder 21.

Expansion Stroke

During expansion of the hydraulic shock absorber 200, the vehicle body side tube 11 and the wheel side tube 12 are expanded relatively, and the suspension spring 34 is expanded. The piston rod 24 moves backward from the damper cylinder 21. The oil in the piston rod side oil chamber 27A flows to the piston side oil chamber 27B through the bypass oil passage 46 of the piston 26 during low speed movement, and the expansion side damping force is obtained on the basis of a throttle resistance of the needle valve 47A during this time. During middle and high speed movement, the oil in the piston rod side oil chamber 27A flows to the piston side oil chamber 27B through the expansion side damping valve 63 in the expansion side oil passage 61 of the piston 26, and the expansion side damping force is obtained on the basis of a deflection resistance of the expansion side damping valve 63 during this time. The expansion side damping force prevents the suspension spring 34 from resonating.

In this case, at the time of maximum expansion of the hydraulic shock absorber 200, a rebound spring 39 supported in a backup manner by a spring receiver 38 engaged with the outer peripheral portion in the upper end side of the damper cylinder 21 is compressed by the upper end washer of the oil lock collar 36, and a maximum expansion stroke is controlled.

During expansion of the hydraulic shock absorber 200, oil in an amount corresponding to the backward moving volume of the piston rod 24 from the damper cylinder 21 is resupplied to the piston side oil chamber 27A from the oil reservoir chamber 28 through the oil passage 70 of the damper cylinder 21.

In the hydraulic shock absorbing apparatus 1, the expansion and compression vibration of the suspension spring 34 is dampened by the compression side damping force generated by the compression side damping force generating means 101 of the hydraulic shock absorber 100 in the compression stroke, and by the expansion side damping force generated by the expansion side damping force generating means 201 of the hydraulic shock absorber 200 in the expansion stroke.

In accordance with the present embodiment, the following effects can be obtained.

(1) The hydraulic shock absorber 100 in the side generating the compression side damping force generates the compression side damping force by the compression side damping valve 43 provided in the piston 26 sliding within the damper cylinder 21. Accordingly, it is not necessary that the hydraulic shock absorber 100 in the side generating the compression side damping force has the compression side damping force generating apparatus in which the compression side damping valve and the expansion side check valve are provided in the sub piston fixed to the bottom portion of the damper cylinder 21. In this manner, it is possible to reduce the manufacturing cost.

(2) In the hydraulic shock absorber 100, the volume compensating oil passage 50 of the piston rod 24 which communicates the piston rod side oil chamber 27A in the inner portion of the damper cylinder 21 with the oil reservoir chamber 28 in the outer side of the damper cylinder 21. Accordingly, during compression, substantially all of the working fluid in the piston side oil chamber 27B reaches the piston rod side oil chamber 27A through the compression side damping valve 43, and further flows to the oil reservoir chamber 28 in the outer side of the damper cylinder 21 via the oil passage 50.

Accordingly, in comparison with the case that the volume compensating oil passage 50 is provided in the side of the piston side oil chamber 27B, substantially all of the working fluid passes through the compression side damping valve 43, so that it is possible to generate a stable compression side damping force.

In the case that the volume compensating oil passage 50 is provided in the side of the piston side oil chamber 27B, the compression side damping valve 43 of the piston 26 and the oil passage 50 in the side of the piston side oil chamber 27B form parallel flow passages with each other. It is difficult to set the size of the oil passage 50 in the side of the piston side oil chamber 27B, and the compression side damping force is not stably generated.

(3) It is not necessary that the hydraulic shock absorber 200 in the side generating the expansion side damping force has the compression side damping force generating apparatus in which the compression side damping valve and the expansion side check valve are provided in the sub piston fixed to the bottom portion of the damper cylinder 21. It is thereby possible to reduce the manufacturing cost.

(4) The damping force adjusting valve, the needle valve 47A, provided in the hydraulic shock absorber 100 in the side generating the compression side damping force serves as the compression side damping force adjusting apparatus. The damping force adjusting valve, the needle valve 47A, provided in the hydraulic shock absorber 200 in the side generating the expansion side damping force serves as the expansion side damping force adjusting apparatus. Accordingly, it is possible to independently adjust the damping force in each of the hydraulic shock absorbers 100 and 200.

In the conventional art, since both of the left and right hydraulic shock absorbers 100 and 200 are provided with both of the expansion side damping force adjusting apparatus and the compression side damping force adjusting apparatus, it is necessary to adjust the left and right compression side damping force adjusting apparatuses during adjustment of the compression side damping force. It is also necessary to adjust the left and right compression side damping force adjusting apparatuses in an equal amount. Further, it is necessary to adjust the left and right expansion side damping force adjusting apparatuses during adjustment of the expansion side damping force. It is necessary to adjust the left and right expansion side damping force adjusting apparatuses in an equal amount.

(5) Since the oil passage 50 is formed on the side wall of the damper cylinder 21, the structure can be made simple, and the cost can be reduced.

(6) Since the oil passage 50 is provided in the guide member, the rod guide 51, of the piston rod 24, it is possible to improve dimensional accuracy of the size of the oil passage 50.

As a further description of the disclosure set out hereinbefore the present disclosure sets out an arrangement where, when the respective check valves are closed, working fluid is diverted to the respective damping valves for controlled damping. When the respective check valves are open, those check valves operate as normal check valves, that is, they do not damp flow through them in the open configuration. They are arranged to allow fluid to flow as freely as is physically possible in the open position, except for unintended frictional effects. This is the normal characteristic of a check valve, particularly the check valves of the present application.

The physical arrangement of the check valves shown in the detailed drawing figures is only one of many possible check valve styles.

Figure 6:
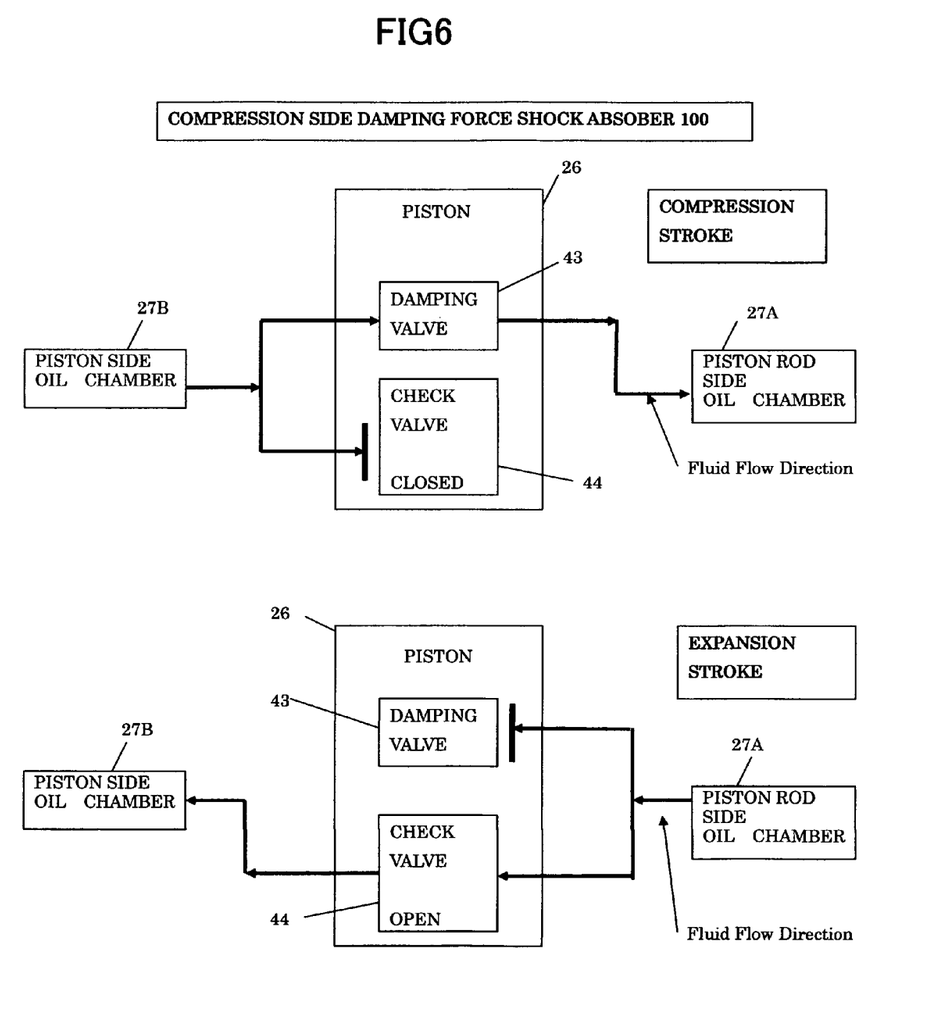
FIG. 6 is a schematic view of the shock absorber.
Figure 7:
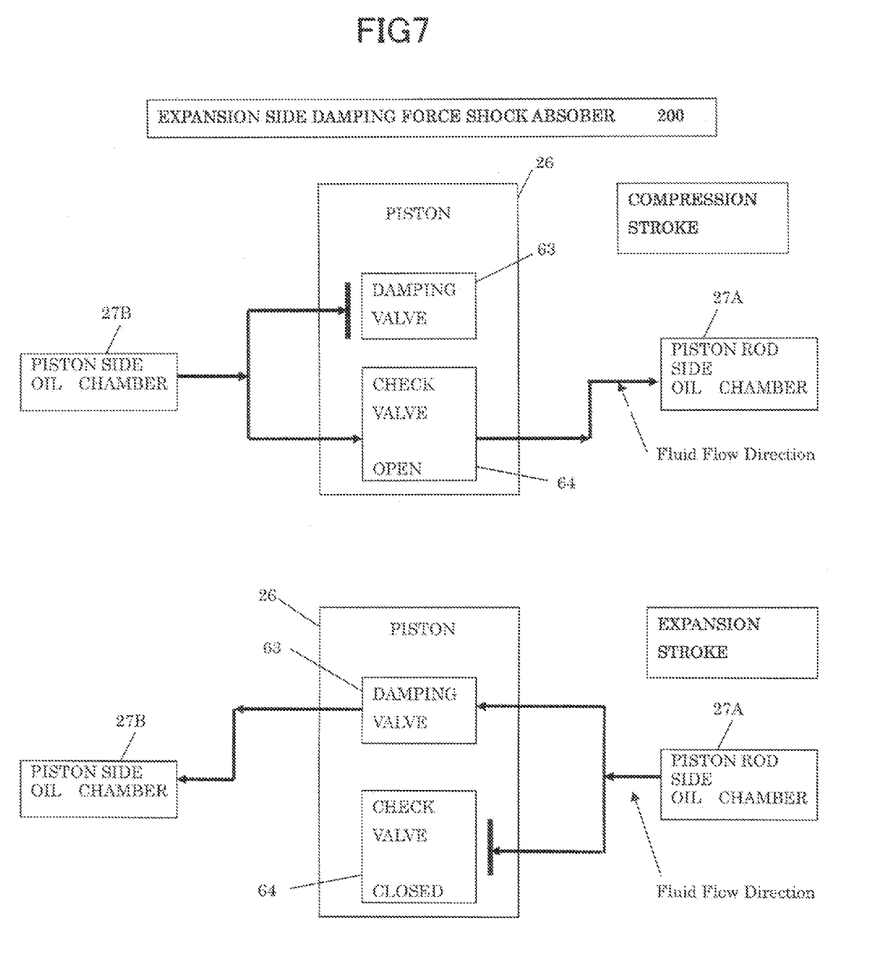
FIG. 7 is a schematic view of the shock absorber.

FIGS. 6 and 7 describe the function of the check valves disclosed hereinbefore.

As mentioned above, in accordance with the present invention, in the hydraulic shock absorbing apparatus in which hydraulic shock absorbers are provided at the left and right sides of the wheel, it is possible to make the damping valve structure in each of the hydraulic shock absorbers simple, thereby reducing the manufacturing cost.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic shock absorbing apparatus of a vehicle comprising:
  a first and a second hydraulic shock absorber provided adjacent a wheel;
  each of the hydraulic shock absorbers comprising:
  a vehicle body side tube and a wheel side tube being slidably fitted;
  a damper cylinder and a piston rod having a piston slidable within the damper cylinder, the piston being mountable to a leading end portion of the piston rod, the damper cylinder being mountable to an inner side of the wheel side tube, the piston rod being mountable to an inner side of the vehicle body side tube;
  a piston rod side oil chamber receiving the piston rod and a piston side oil chamber not receiving the piston rod are sectioned in both sides of the piston;
  two oil passages communicating with the two oil chambers being provided in the piston;
  an oil reservoir chamber for compensating a volume of the piston rod being composed of an annular space formed by an outer periphery of the damper cylinder and an outer periphery of the piston rod protruded from the damper cylinder, both of which are surrounded by the vehicle body side tube and the wheel side tube, and whose upper part is constituted as a gas chamber,
  one of the hydraulic shock absorbers being arranged to damp during compression stroke of the hydraulic shock absorber, said one of the hydraulic shock absorbers having a compression side damping valve in one of the two oil passages of the piston, a check valve closing at the time of compression and opening at the time of expansion in the other of the two oil passages of the piston, and a cylinder oil passage opened at the side wall of the upper end side of the damper cylinder so as to communicate the piston rod side oil chamber with the oil reservoir chamber around the outer periphery of the damper cylinder, for compensating a volume of the piston rod for common use for both of compression and expansion,
  the cylinder oil passage discharges oil in an amount corresponding to the forward moving volume of the piston rod to the damper cylinder from the piston rod side oil chamber to the oil reservoir chamber during compression stroke of the one of the hydraulic shock absorbers, and
  the cylinder oil passage resupplies oil in an amount corresponding to the backward moving volume of the piston rod from the damper cylinder to the piston rod side oil chamber from the oil reservoir chamber during expansion stroke of the one of the hydraulic shock absorbers,
  another of the hydraulic shock absorbers being arranged to damp during expansion stroke of the hydraulic shock absorber, said another of the hydraulic shock absorbers having an expansion side damping valve in one of the two oil passages of the piston, a check valve closing at the time of expansion and opening at the time of compression in the other of the two oil passages of the piston, and a cylinder oil passage opened at the side wall of the lower end side of the damper cylinder so as to communicate the piston side oil chamber with the oil reservoir chamber around the outer periphery of the damper cylinder, for compensating a volume of the piston rod for common use for both of compression and expansion,
  the cylinder oil passage discharges oil in an amount corresponding to the forward moving volume of the piston rod to the damper cylinder from the piston side oil chamber to the oil reservoir chamber during compression stroke of the another of the hydraulic shock absorbers, and
  the cylinder oil passage resupplies oil in an amount corresponding to the backward moving volume of the piston rod from the damper cylinder to the piston side oil chamber from the oil reservoir chamber during expansion stroke of the another of the hydraulic shock absorbers.

2. A hydraulic shock absorbing apparatus of a vehicle according to claim 1, wherein a bypass oil passage communicating the oil chambers in both sides of the respective pistons is disposed in the piston rod of each of the hydraulic shock absorbers, and a damping force adjusting valve is disposed in the bypass oil passage.

3. A hydraulic shock absorbing apparatus of a vehicle comprising:
  a first and a second hydraulic shock absorber provided adjacent a wheel;

each of the hydraulic shock absorbers comprising:

a vehicle body side tube and a wheel side tube being slidably fitted;

a damper cylinder and a piston rod having a piston slidable within the damper cylinder, the piston being mountable to a leading end portion of the piston rod, the damper cylinder being mountable to an inner side of the wheel side tube, the piston rod being mountable to an inner side of the vehicle body side tube;

a piston rod side oil chamber receiving the piston rod and a piston side oil chamber not receiving the piston rod are sectioned in both sides of the piston;

two oil passages communicating with the two oil chambers being provided in the piston;

an oil reservoir chamber for compensating a volume of the piston rod being composed of an annular space formed by an outer periphery of the damper cylinder and an outer periphery of the piston rod protruded from the damper cylinder, both of which are surrounded by the vehicle body side tube and the wheel side tube, and whose upper part is constituted as a gas chamber;

a guide member provided with a upper end portion of the damper cylinder, and slidably supporting the piston rod, one of the hydraulic shock absorbers being arranged to damp, during compression stroke of the hydraulic shock absorber, said one of the hydraulic shock absorbers having a compression side damping valve in one of the two oil passages of the piston, a check valve closing at the time of compression and opening at the time of expansion in the other of the two oil passages of the piston, and a cylinder oil passage provided in the guide member so as to communicate the piston rod side oil chamber with the oil reservoir chamber around the outer periphery of the piston rod protruded from the damper cylinder, for compensating a volume of the piston rod for common use for both of compression and expansion, the cylinder oil passage discharges oil in an amount corresponding to the forward moving volume of the piston rod to the damper cylinder from the piston rod side oil chamber to the oil reservoir chamber during compression stroke of the one of the hydraulic shock absorbers, the cylinder oil passage resupplies oil in an amount corresponding to the backward moving volume of the piston rod from the damper cylinder to the piston rod side oil chamber from the oil reservoir chamber during expansion stroke of the one of the hydraulic shock absorbers, another of the hydraulic shock absorbers being arranged to damp, during expansion stroke of the hydraulic shock absorber, said another of the hydraulic shock absorbers having an expansion side damping valve in one of the two oil passages of the piston, a check valve closing at the time of expansion and opening at the time of compression in the other of the two oil passages of the piston, and a cylinder oil passage opened at the side wall of the lower end side of the damper cylinder so as to communicate the piston side oil chamber with the oil reservoir chamber, for compensating a volume of the piston rod for common use for both of compression and expansion, the cylinder oil passage discharges oil in an amount corresponding to the forward moving volume of the piston rod to the damper cylinder from the piston side oil chamber to the oil reservoir chamber during compression stroke of the another of the hydraulic shock absorbers, and the cylinder oil passage resupplies oil in an amount corresponding to the backward moving volume of the piston rod from the damper cylinder to the piston side oil chamber from the oil reservoir chamber during expansion stroke of the another of the hydraulic shock absorbers.

4. A hydraulic shock absorbing apparatus of a vehicle according to claim 3, wherein a bypass oil passage communicating the oil chambers in both sides of the respective pistons is disposed in the piston rod of each of the hydraulic shock absorbers, and a damping force adjusting valve is disposed in the bypass oil passage.

* * * * *